United States Patent [19]

Heikkinen

[11] Patent Number: 5,343,528

[45] Date of Patent: Aug. 30, 1994

[54] PROCEDURE AND DECODER FOR DECRYPTING A CODED VIDEO SIGNAL

[75] Inventor: Ari Heikkinen, Salo, Finland

[73] Assignee: Nokia Technology GmbH, Pforzheim, Fed. Rep. of Germany

[21] Appl. No.: 28,652

[22] Filed: Mar. 9, 1993

[30] Foreign Application Priority Data

Mar. 11, 1992 [FI] Finland .................... 921056

[51] Int. Cl.$^5$ .................................. H04N 7/167
[52] U.S. Cl. ......................... 380/20; 380/10; 380/9
[58] Field of Search ...................... 380/20, 10, 9

[56] References Cited

U.S. PATENT DOCUMENTS

| | | | |
|---|---|---|---|
| 4,670,904 | 6/1987 | Rumreich | 380/20 |
| 4,945,563 | 7/1990 | Horton et al. | 380/20 |
| 4,995,079 | 2/1991 | Kim | 380/20 |

*Primary Examiner*—David C. Cain

[57] ABSTRACT

A procedure and a decoder for decrypting the encryption of a coded video signal at a given point of time, in which the decoder (1) is tuned to a given receive channel for a given point of time using the channel and timer system of a video recorder (2) electrically in conjunction with the decoder by means of a video connection (VIDEO). The decoder (1) is tuned to a home channel while in a stand-by, whereby it receives data from the home channel. The mode of the input (IN1) of the video connection of the decoder is detected, and if a video signal is detected to approach from the video connection (IN1), said video signal from the video connection (IN1) is coupled to the decryption circuits (7) of the decoder. When the entry of the video signal from the video connection (IN1) ends, a signal from the home channel is coupled to the decryption circuits (7) of the decoder.

8 Claims, 1 Drawing Sheet

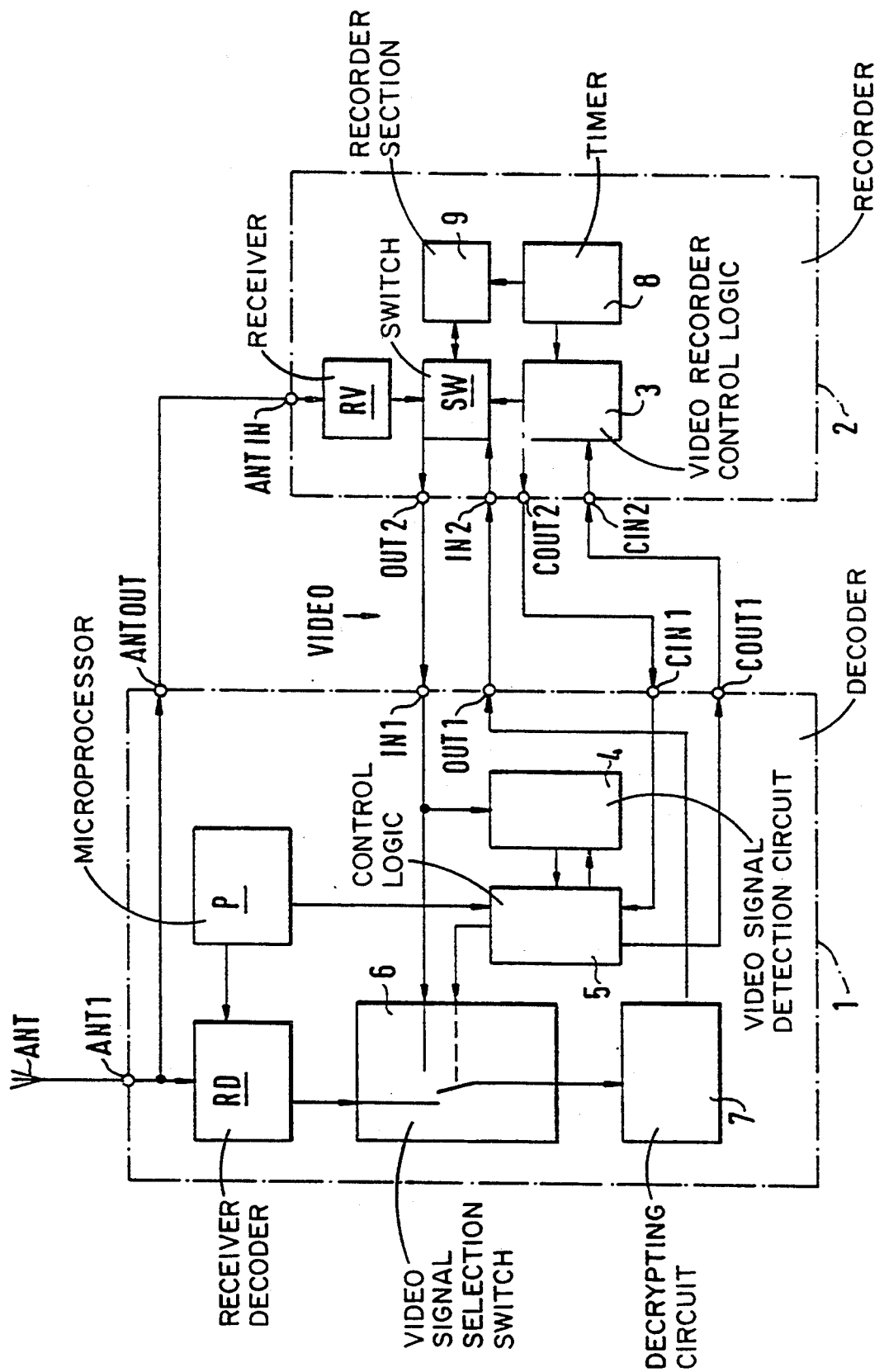

PROCEDURE AND DECODER FOR DECRYPTING A CODED VIDEO SIGNAL

The present invention relates to a procedure and a decoder for decrypting a coded video signal at a given point of time when the decoder is tuned to a given receive channel at a given point of time using the channel selection and timer system of a video recorder being electrically connected to the decoder by means of the video connection.

Coded video signals are used in transmissions of several satellite programmes and cable network programmes so that only those who have paid for the programme are authorized to watch said programmes with the aid of so-called home sets, i.e. decoders which decrypt the programme. The decoder has to be tuned to the channel on which the viewer wants to view an incoming programme so that it is enabled to decrypt the right code. The tuning of the decoder is usually carried out manually so that a viewer selects the television channel in his home connection unit on which he wishes to watch incoming programmes, whereby the video signal is transmitted into the TV set via the home set which in conjunction with the channel selection has thus been tuned automatically to the right channel and which therefore is enabled to perform the decoding of an encoded programme from said channel.

Video recorders are usually provided with a timer system with which the video recorder can be programmed to record a desired programme or programmes. On the basis of the date, time and channel programmed in the timer, the video recorder is at a desired moment switched on to the programmed channel, in to a recording mode and records the programme on a video tape. If we want to record a programme from a paychannel, the decoder has to be tuned to said channel simultaneously. The viewer himself is able to record a coded programme with ease by setting a decryption decoder on the programme channel. Also recording from one coded channel in the absence of a viewer can easily be carried out with the timer of the video recorder by setting the decoder into a stand-by on said channel, whereby the decoder is in stand-by mode for decrypting the encryption emitted from said channel, and the video recorder may record the programme.

Recording carried out with a timer from chargeable programme channels is made more difficult when recording programmes from several channels. The date, time, channel and length of programmes to be recorded are programmed in the memory of the video recorder. For the video recorder to be able to record programmes from paychannels, also the decoder has to be tuned for said channel. Tuning the decoder for a desired channel for a desired point of time has been implemented by adding a programmable timer of its own in the decoder. Now, not only the timer of the video recorder is programmed, but also the timer of the decoder has to be programmed to tune the decoder for the right channel for the point of time when the video recorder starts to record a programme from the channel. A problem in this solution is that the user has to program the timer of both the video recorder and the decoder for recording the programme. The programming requires such precision that the same data are supplied into the timers of both the video recorder and of the decoder, and in addition, more time is needed for programming two timers. A remote controller is often used for programming the timers of the video recorder and the decoder, so that different remote controllers are usually provided for the video recorder and the decoder, the use of which are different, and this increases a risk of erroneus programming and a risk of losing the desired programme. Another significant problem related to said solution is that the decoder needs a user connection for programming its timer. In order to implement said user connection, a display, real time clock for the real time of the timing function, and in addition, keyboard, and/or remote control functions, and a remote controller for carrying out the programming is needed. The remote control functions of the decoder can be added in the remote controller of the video recorder, so that an extra remote controller is not needed, but the additional functions to be provided in the remote controller of the video recorder make the use of the remote controller, which is already fairly complicated, even more difficult and somewhat increase the production costs of the remote controller. On the other hand, if a separate remote controller has been provided for the decoder, the costs are even higher than those in a common remote controller. Moreover, the display and the real time clock required for the user connection increase the production costs of the decoder.

Endeavours have been made to avoid the above mentioned problems by using the user connection of the video recorder, i.e. by utilizing the channel selection and timer system of the video recorder for programming the decoder. Thus, when a video recorder is connected to make a recording from a given channel, the decoder is also tuned on said channel, whereby the decoder is prepared to decrypt the encryption. A problem involved herewith is that the decoder makes use of the channel selection and timer system of only the video recorder. Therefore, the decoder is in principle prepared to decrypt the encryption when the video recorder is coupled for recording. The chargeable coded programme channels usually include active data traffic for each decoder for transmitting individually addressed messages and decryption keys. So, because the decoder is dependent on the tuning system of the video recorder, disturbances may be caused in the data traffic, resulting in breakdown of an internal data channel. As a result of such breakdown in the data channel, the decoder may not have the authorizations and decryption keys it needs, so that when the video recorder starts recording, the decoder is not able to decrypt the encryption. It is only after an indefinite period of time from the start of the recording that the decoder is able to decrypt the encryption. In such instance the recording already has at least partly been unsuccessful.

The object of the present invention is to implement a procedure with which an encryption of a coded video signal can be decrypted at a desired point of time by tuning the decoder for a desired channel without any of the above mentioned problems.

The decoder is, while in stand-by, tuned for a so-called home channel of its own, whereby the decrypting circuits receive a video signal included in a data channel, and the decoder maintains a continuous data link in the data channel. The home channel means a channel with which the decoder receives from the computer of the transmission end the authorization and keys it needs for decrypting the encryption. The video recorders are usually provided with a control for the video connection in conjunction with the video connection to provide information to the external device coupled to the connection when repeating the tape, that said external device is enabled to receive a signal from the video connector. When the video recorder is in the recording mode, the control of said video connector is not coupled to the output of the video connector. For implementing the procedure according to the invention, a control logic is inserted in the decoder to control the detection circuit of the video signal needed in the system to detect a signal entering the decoder from the video output of the video recorder. The video signal detection is necessary because the video recorder is not capable of providing the above control while being in recording mode. When the video signal detection circuit finds that the signal to be detected is a video signal, the control logic concludes that the timer has controlled the video recorder into a recording mode and controls the video signal from the video recorder of the decoder video connection to the decrypting circuits by means of a video signal selection switch required in the method. The video connection of the video recorder is usually provided with an input with which the video recorder can be controlled externally to receive an external video signal. In the method of the invention, the control logic of the decoder sends a command to the control logic of the video recorder to move on to receive from the decoder a decrypted video signal. After the recording is over, the video recorder turns into stand-by, whereby the video signal detection circuit detects the termination of the video signal and the control logic controls with a video signal selection switch a video signal emitted from the home channel of the decoder to the decrypting circuits. Into the processor of the decoder a so-called recording stand-by can be programmed, in order to implement the procedure of the invention, so that it is continuously on, or that it can be switched on. When the recording stand-by is on, the control logic activates the detection on circuit of the video signal to detect if any video signal is coming in from the video connection.

The procedure of the invention is characterized in that
- the decoder is tuned to the home channel while in stand-by, whereby it receives data from the home channel,
- the input mode of the video connection of the decoder is detected,
- if a video signal is found to be emitted from the video connection, said video signal emitted from the video connection is coupled to the decrypting circuits of the decoder, and
- when the input of the video signal from the video connection ends, the signal from the home channel is coupled to the decypting circuits of the decoder.

The invention is described below in detail by referring to the annexed FIGURE showing an example of an implementation of the procedure of the invention.

The FIGURE shows antenna ANT, decoder 1, video recorder 2, and connections ANT1, ANTOUT and ANTIN from the antenna ANT to the decoder 1 and the video recorder 2 (an inlet through the decoder), and a video connection VIDEO between the decoder 1 and the video recorder 2 comprising input IN1, IN2 and output OUT1, OUT2, and control input CIN1, CIN2, and control output COUT1, COUT2 in both apparatus. In systems based on using channel-internal data a so-called home channel has been provided for the decoder 1 to which the decoder 1 is tuned every time when in stand-by and from which it receives continuous data from the computer of the transmission system. The receiver RD of the decoder 1 receives a signal from the antenna connection ANT1, and the microprocessor P tunes the channel selector to the home channel for receiving data. A continuous data link with the computer controlling the system is in this manner maintained and the requisite authorizations and the decryption keys are all the time available to be received. When the timer 8 of the video recorder 2 has been programmed to record a desired programme, the video recorder 2 is usually set in stand-by. Hereby, if one wishes to record a coded programme, the decoder 1 is set to a recording standby. Thereafter, the video recorder 2 is activated, controlled by the timer 8, to a desired channel into a recording mode according to the programming. When the video recorder 2 is in stand-by, the power has been switched off from all conceivable stages for minimizing the power consumption. Now, no signal enters the video connection VIDEO, nor any emits therefrom, provided for the external device of the video recorder. The video recorder 2 is provided with a video connection control logic 3 in conjunction with the video connection VIDEO to inform, in playing the tape, the external means connected to the connection VIDEO that said external means is enabled to move to receive a signal from the video connection. When the video recorder 2 is in the recording mode, said video connection control logic 3 does not enter video connection control output COUT2. The video connection control logic 3 is provided with input CIN2 with which the video recorder 2 can externally be controlled to receive an external video signal. With the control of said input CIN2, the video recorder 2 is made to receive a decrypted signal via video connector IN2 from the decoder 1 (from video connector OUT1) intended to be recorded. The video recorder control logic 3 controls the video signal from the decoder 1 to the recorder section 9 by means of a switch SW. In normal state, the switch SW transfers the signal from the antenna connection ANTIN via the receiver RV to the recorder section 9.

With the procedure of the invention, a data link with the computer is all the time maintained. The method of the invention is implemented using a video signal detection circuit 4, a control logic 5, and a video signal selection switch 6. After the decoder 1 has been connected into the recording stand-by, the control logic 5 activates the video signal detection circuit 4. Since no direct control for recognizing the recording is emitted from the video recorder 2, the detection of the recording is in the method according to the invention implemented by monitoring the video output OUT2 of the video recorder (i.e. input IN1 of the video connection of the decoder) with the video signal detection circuit 4 used in the method. If no signal is emitted by the video recorder 2 to the video output OUT2, the recorder is assumed to be in stand-by. When the video recorder starts, controlled by the timer 8, from the stand-by and is tuned to the programmed channel, a detectable video signal is detected in the video output OUT2, and now the video signal detection circuit 4 assumes that the recording started. A video signal from the video connection input IN1 to the decoder is coupled to decrypting circuits 7 by means of a video signal selection switch 6 used in the method, being controlled by the control logic 5. Since the decoder 1 has been tuned to the home channel, it has continuously received authorizations and decryption keys emitted by the computer of the transmission end and requested by the decoder, and it is thus immediately prepared to decrypt the coded video signal and to transfer the decrypted signal to the output OUT of its video connector, wherefrom the video recorder 2 receives the signal for storing. After the recording is over, the video recorder 2 turns into stand-by, whereby the video signal detection circuit 4 detects the entry of the video signal being terminated from the input IN1 of the video connection. Hereby, the control logic 5 controls with the selection circuit 6 the video signal emitted from the home channel of the decoder 1 to the decryption circuits 7 (said signal entering the home channel from the antenna connection ANT1). With the video signal selection switch 6 the video signal can therefore be coupled to enter the decryption circuits 7 either via the receiver RV from the antenna connection ANT1 (the signal of the home channel) or from the video connection IN1.

With the procedure of the present invention in which it is monitored with a video signal detection circuit 4 if the video recorder 2 is in recording mode or not, a user-friendly decoder decrypting a coded television programme can be implemented in order to record programmes from a desired channel at a desired point of time on the basis of preprogramming. In the procedure according to the invention, no decoder timer is needed, and therefore programming of the decoder timer can be omitted, and a data link with the computer of the transmission end remains continuous, said decoder 1 being unperceived by the user because the user need not program it, and the recording being undisturbed therethrough. Using the procedure of the present invention in the recording arrangement of the coded programme, merely the programming of the timer 8 of the video recorder 2 and selection of the recording stand-by of the decoder 1 are sufficient. The user terminal of the decoder 1 may be regarded to be simple, and costs are thus saved. When the video recorder 2 is connected to record, the decoder 1 is always ready to decrypt an encryption because the data traffic comprising messages addressed individually to the decoder and keys for decrypting the encryption, can be received continuously (in the stand-by from the home channel, in active mode from the video connection), and in this manner the recording cannot fail because of any missing decryption keys or authorizations.

I claim:

1. A method for decrypting a coded video signal at a given point of time, in which a decoder (1) is tuned to a certain reception channel at a given point of time using a channel selection and timer system of a video recorder (2) electrically coupled to the decoder (1) by video connection means (VIDEO), comprising the steps of:
   tuning the decoder (1) to a home channel when it is in a stand-by mode for receiving decryption data from the home channel;
   switching a coded video signal to a decryption circuits (7) in the decoder (1) when it is detected from the video recorder (2) at an input (IN1) of the video connection means (VIDEO); and
   switching the home channel to the decryption circuits (7) when the coded video signal is no longer detected from the video recorder (2) at the input (IN1) of the video connection means (VIDEO).

2. Procedure according to claim 1, characterized in that the state of the input (IN1) of the decoder video connection is detected with a detection circuit (4).

3. Procedure according to claim 1, characterized in that said video signal from the video connection (IN1) and said signal from the home channel are coupled to the decoder decryption circuits (7) by means of a video signal selection switch (6).

4. Procedure according to claim 4, characterized in that the selection switch (6) is controlled with control logic (5).

5. Procedure according to claims 2 and 4, characterized in that the control logic (5) receives information on a change in the mode of the input (IN1) of the video connection from a detection circuit (4).

6. Procedure according to claim 5, characterized in that the decoder (1) is provided with a recording stand-by, which, when being on, the control logic (5) activates the detection circuit (4) to detect the mode of the input (IN1) of the video connection.

7. A decoder (1) for decoding the encryption of a coded video signal at a given point of time, said decoder (1) being provided with an antenna (ANT1) and video connection (VIDEO), comprising an input (IN1) and an output (OUT1), with a receiver (RD) connected to the antenna connection (ANT1), and with a decryption circuit (7), characterized in that it comprises
   a detection circuit (4) for detecting the mode of the input (IN1) of the video connection,
   a control logic (5) connected to the detection circuit (4) so that it controls the detection circuit (4) and receives therefrom information on the mode of the video connection input (IN1),
   a video signal selection switch (6) provided with two switch positions, whereby it can be switched either to the receiver (RD) or the input (IN1) of the video connection, and with a control from the control logic (5), and it is provided with an output connected to the decoder decryption circuit (7), the output of which being connected to the output (OUT1) of the video connection.

8. A method for recording an external video signal from a decoder (1) in a recorder (2), comprising the steps of:
   tuning a receiver (RD) in the decoder (1) for receiving a home channel from an incoming video signal;
   switching with a video signal selection switch (6) the home channel to a decrypting circuit (7) for continuously monitoring authorization and decryption keys from a provider of the home channel when the decoder (1) and the recorder (2) are in a standby mode;
   tuning a receiver (RV) in the recorder (2) for receiving a video recording signal from the incoming video signal when the recorder (2) is in a recording mode;
   providing the video recording signal from the video recorder (2) to the decoder (1);
   detecting with a video signal detection circuit (4) in the decoder (1) that the video recording signal is a coded video signal;
   providing from a control logic (5) a video control signal to a video recorder control logic (3) in the recorder (2) for indicating that the decoder (1) will provide an external video signal to the recorder (2);
   switching the coded video signal with the video signal selection switch (6) to the decrypting circuit (7);
   decrypting with the decrypting circuit (7) the coded video signal into a decrypted video signal;
   providing the decrypted video signal from the decoder (1) to the video recorder (2) as the external video signal; and
   switching with a video recorder switch (SW) in the recorder (2) the external video signal to the recorder section (9); and
   recording the external video signal in the recorder section (9).

* * * * *